United States Patent [19]

Amos et al.

[11] Patent Number: 5,724,171
[45] Date of Patent: Mar. 3, 1998

[54] OPTICAL SCANNING APPARATUS

[75] Inventors: William Bradshaw Amos; John Francis William Mallett, both of Cambridge; Richard Henderson, Great Shelford, all of United Kingdom

[73] Assignee: Medical Research Council, London, England

[21] Appl. No.: 556,953

[22] PCT Filed: Apr. 26, 1994

[86] PCT No.: PCT/GB94/00887

§ 371 Date: May 16, 1996

§ 102(e) Date: May 16, 1996

[87] PCT Pub. No.: WO94/27167

PCT Pub. Date: Nov. 24, 1994

[30] Foreign Application Priority Data

May 19, 1993 [GB] United Kingdom ............... 9310267

[51] Int. Cl.[6] ..................................... G02B 26/08
[52] U.S. Cl. ................ 359/201; 359/209; 359/211; 359/226; 358/493
[58] Field of Search ........................... 359/198, 200, 359/201, 209–212, 203, 226, 833, 834; 369/44.17, 44.18; 358/474, 493, 302

[56] References Cited

FOREIGN PATENT DOCUMENTS

| 3142543 | 6/1982 | Germany. |
|---|---|---|
| 3601442 | 7/1987 | Germany. |
| 2152697 | 8/1985 | United Kingdom. |

*Primary Examiner*—James Phan
*Attorney, Agent, or Firm*—Lee, Mann, Smith, McWilliams, Sweeney & Ohlson

[57] ABSTRACT

Optical scanning apparatus is disclosed wherein a plurality of reading heads are mounted on a rotating support, and a light source directs light through an optical beam switching means which rotates about an axis colinear with that of the support but at half the rotational speed, whereby the reading heads are caused to be successively operational in turn over a given segment of each revolution of the support, which has a linear transnational movement relative to image-bearing subject(s) to be read.

14 Claims, 5 Drawing Sheets

OPTICAL SCANNING APPARATUS

FIELD OF THE INVENTION

This invention relates generally to optical scanning apparatus, more especially in the field of phosphor image-storage plate scanning and secondarily to the optical scanning of gels. However, the invention also has general application to scanning microscopy and the optical scanning of materials for electronic or photographic purposes.

BACKGROUND TO THE INVENTION

In many types of scanning apparatus, a lens or other light transmitting device is placed close to the subject and moved over its surface, usually in a raster fashion. This device, which is referred to herein as a reading head, serves both to concentrate a light beam to form a small spot on the specimen and to receive radiation emitted from or reflected by the specimen in the region of the spot. The value of placing the reading head close to the subject is to increase the solid angle of acceptance of radiation emitted by the specimen (thus increasing the sensitivity of detection), to improve the resolution of the focussed spot of incident illumination and to increase the efficiency of confocal optics, assuming suitable other optical apparatus is present.

In order to scan, the reading head must be moved over the subject or vice versa or a combination of such movements employed. Thus Amemiya, in Physics Research A 266 (1988), pages 645 to 653, describes an arrangement in which the subject, a flexible phosphor image plate, is wrapped around a drum. The drum is then rotated and the reading head moved in a linear fashion parallel to the axis of rotation. Different apparatus is produced by the MAC Company (Japan) and by Marresearch (Germany), in which a planar phosphor image plate is rotated about an axis perpendicular to its surface while a reading head is moved across the surface towards the centre of rotation, thus executing a spiral scan. Neither of these arrangements is satisfactory, since the subject has to be either folded or rotated to be scanned. Particularly with phosphor image plates, it is desirable for the plate (i.e. the subject) to remain stationary during the scan. Brearley, in Patent Specification GB 2152697A, describes a way in which this could potentially be done, by causing the reading head to move linearly. However, Brearley's apparatus also requires the subject to move to produce the frame scan, and provides no special means of conveying the incident radiation to the reading head. The light is conveyed, in Brearley's apparatus, by bathing the entire area of movement of the reading head in incident radiation, with the result that only a small part of this radiation is transmitted to the subject.

The present invention aims to overcome the two problems mentioned above by providing scanning while allowing the subject to be stationary and by directing the incident beam into a reading head in an optically efficient manner.

SUMMARY OF THE INVENTION

According to the invention, there is provided optical scanning apparatus comprising a support having an axis of rotation, a plurality of reading heads mounted on the support to rotate therewith when the support is rotated at uniform angular speed about its axis, at least one optical source, and optical beam-switching means also movable in rotation at uniform angular speed for switching the beam from the source or sources between the reading heads so that successive reading heads are in turn continuously operational over a predetermined segment of a circular line scan, whereby a subject relative to which at least the reading head support of the assembly has a linear translational movement may be read by the reading heads.

Preferably, the return beam from the subject is passed reversely through the beam-switching means to a stationary detector.

The subject may be an image-bearing element, such as a phosphor image-storage element, which is either planar or part-cylindrical. In the former case the scanning path is of circular form; in the latter case the scanning path lies in a plane normal to the axis of the part-cylinder. Thus, at least the reading head support, but possibly also other parts of the assembly, is also linearly translated in a plane parallel to that of an image-storage plate or in a direction parallel to the axis of an image-storage part-cylinder.

In a preferred arrangement, the beam-switching means is an optical assembly producing optical inversion of the beam from the or each source, so that the beam or beams emergent from the beam-switching means rotate at twice the speed of rotation of said beam-switching means. Most preferably, therefore, the speed of rotation of the beam switching means is one half the speed of rotation of the support carrying the reading heads.

One embodiment of beam-inverting, beam-switching means comprises a plurality of single-reflection reflectors angularly spaced around the axis of rotation, and a corresponding plurality of double-reflection reflectors, such as prisms, also angularly spaced around the axis of rotation, the arrangement being such that a beam crosses the axis of rotation in passage between single-reflection and double-reflection reflectors. In order to produce beam-inversion, the total number of reflections occurring in the beam-switching means is required to be an odd number, and is preferably restricted to three reflections.

The beam-incident axis at the beam-switching means is preferably parallel to and spaced a given distance from the axis of rotation, and the beam-emergent axis is preferably parallel to and spaced by the same given distance from the optical axis, the beam-incident and beam-emergent axes being on diametrically opposite sides of the axis of rotation.

A preferred reading head support is a disc having the plurality of reading heads spaced around the axis of rotation of said disc at or close to the periphery thereof. Reflectors such as prisms are preferably used to transfer to successive reading heads the beam or beams emergent from the beam-switching means, which in the preferred arrangement is coaxially mounted with the support disc but is rotated at one half the speed of rotation of said support disc.

The above-described invention allows the scan head to be moved in a smooth continuous rotation, avoiding the problems of acceleration and deceleration which set limits to the speed of mechanical raster scanning. A most important feature of the invention as described is the means by which the light is transmitted to and from the reading heads, which allows for switching between multiple heads by an optical device the only no mechanical motion of which is smooth rotation at constant angular velocity.

BRIEF DESCRIPTION OF THE DRAWINGS

Some embodiments of the invention are now described by way of example with reference to the accompanying drawings, in which.

DETAILED DESCRIPTION OF THE INVENTION

Figure 1:
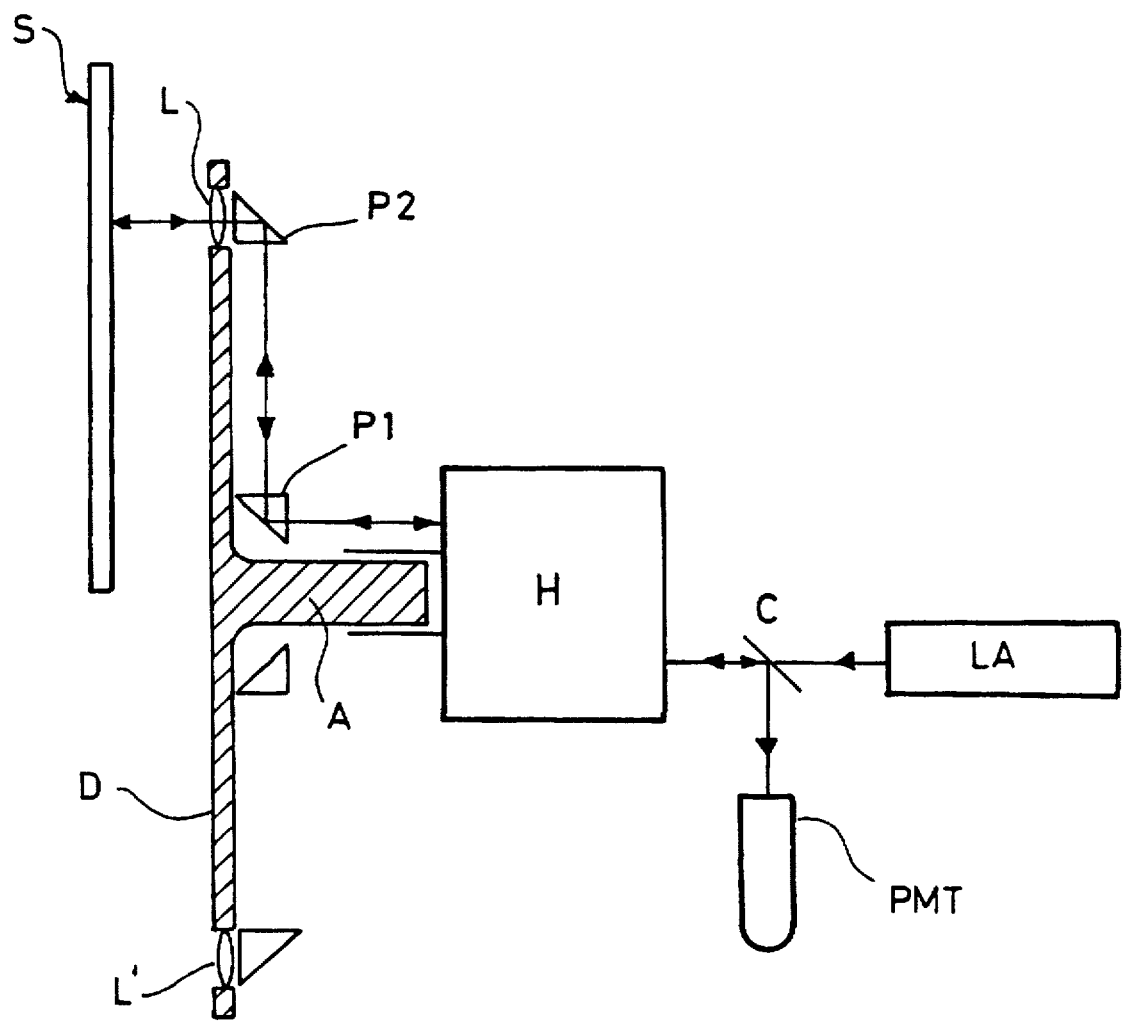
FIG. 1 shows one embodiment of optical scanning apparatus diagrammatically.
Figure 2:
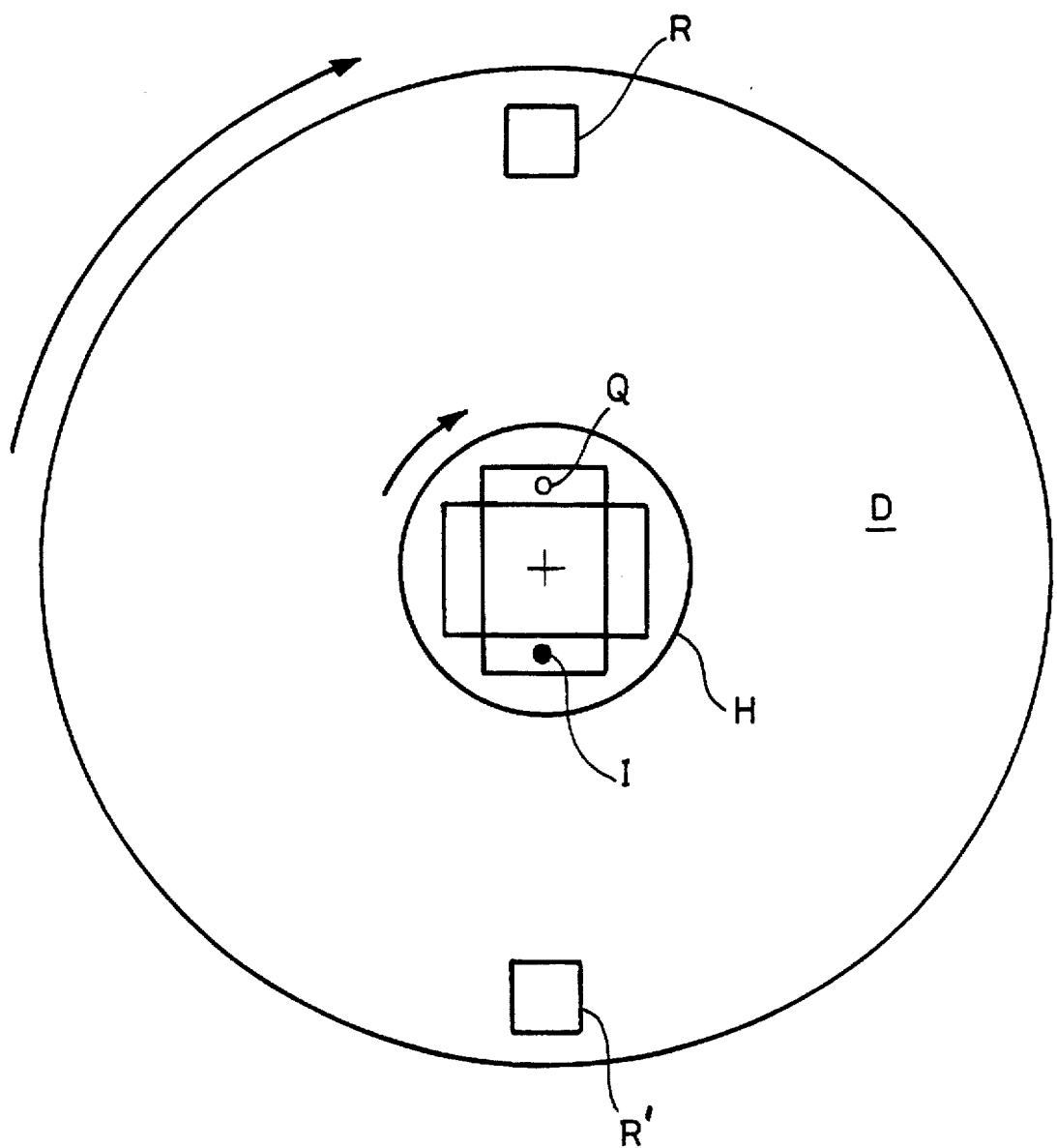
FIGS. 2, 3 and 4 are explanatory diagrams.

In accordance with the present invention, there is provided a disc D or other pivoted supporting structure, bearing a number of reading heads. The cross-hatched area of FIG. 1 represents such a disc in a median cross section with the axis at A. In the preferred form, the reading heads are arranged in the manner of the lenses L and L' in FIG. 1, so that when the disc is rotated they execute scans of approximately circular form over a planar subject S. In another possible embodiment (not shown), prisms such as P2 are omitted and the heads face outwards from the rim of the disc and are able to scan a subject in the form of a concave part-cylinder. The line scan is created by rotation of the disc. The frame scan is produced by linear translation of the entire disc, either in a line parallel to the scanned plane on the subject in the preferred example, or in a line parallel to the axis of the part-cylinder in the second example. In FIG. 2, the disc is shown in plan view with two reading heads R, R1, represented as squares, though the number of scan heads is not restricted to two, as will be described later.

FIG. 1 shows diagrammatically how light from a laser LA is directed through a beam splitter C into a device containing optics of a special form, which will be referred to as hub optics H. From the hub optics, the laser beam emerges and is directed to the active reading head, e.g. by one pair of right-angle prisms P1 and P2, and thence through the reading head lens or other beam-concentrating device L or L'. Light emitted by the subject retraces the path just described, but is separated from the incident beam by splitter C, which in the preferred form is a chromatic beam splitter. In the case of a phosphor plate reader, the incident beam may be that of a red-emitting helium-neon laser and the emitted light would then be the blue light resulting from stimulated luminescence, which would be detected by means of a photomultiplier PMT. Although not shown in the drawing, lenses and apertures to produce confocal operation, barrier and excitor filters and other optical devices would normally be incorporated in the basic system as illustrated.

Figure 3:
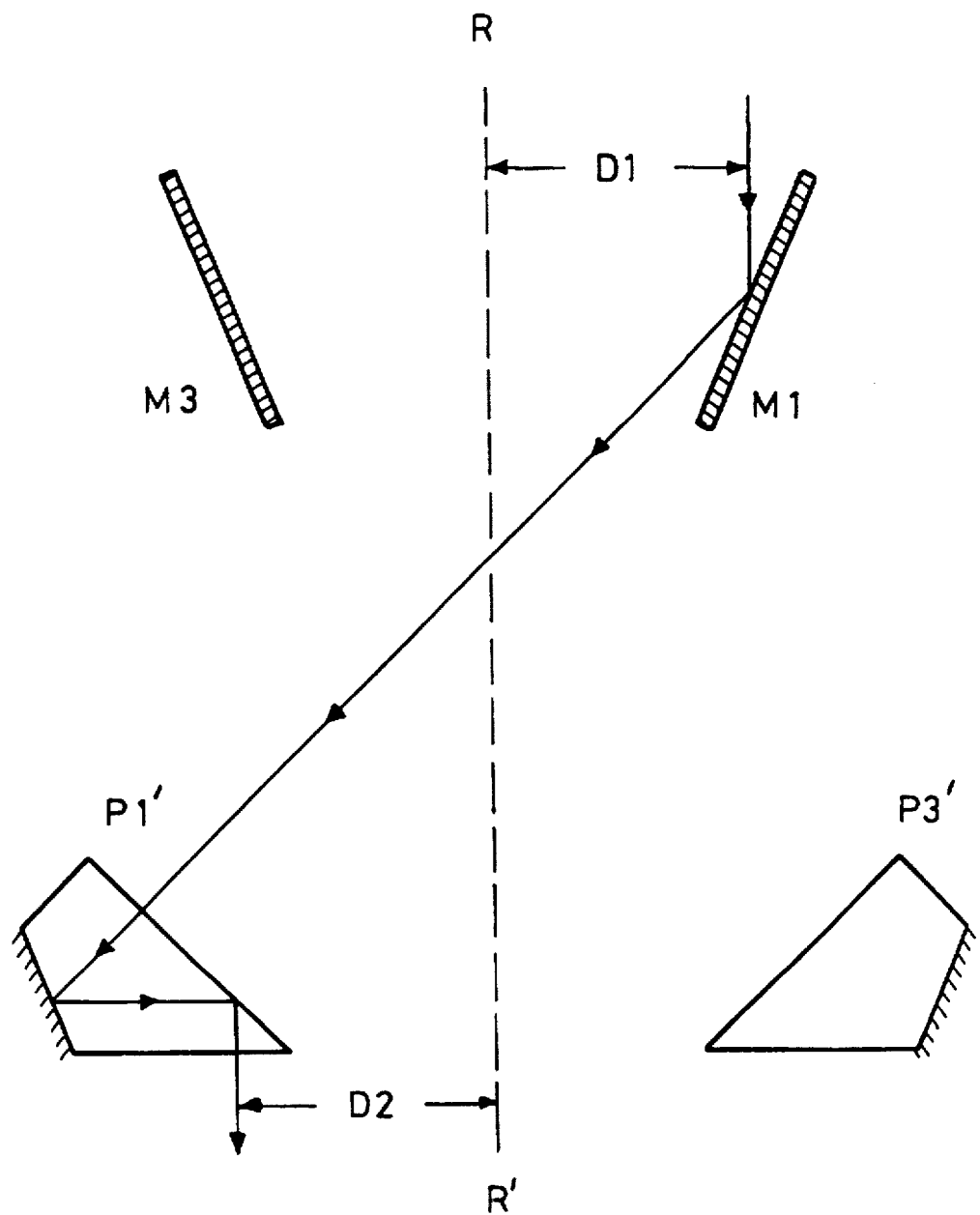

The hub optics H are rotated coaxially with the disc D but at an angular velocity precisely half that of the disc and in an exact phase relationship with the rotation of the disc. FIG. 3 shows one form of the hub optics in a median section through the axis of rotation RR'. In the example shown, a ray of light entering parallel to the axis RR' but at a distance D1 from it strikes first a reflector M1, set at an angle to the axis of rotation. The ray then crosses the axis and enters a prism P1' with a cross-section of a standard form, often termed a '45 degree eyepiece prism'. If such a prism is used, and the reflector M1 is set at 22.5 degrees to the axis, the effect of the prism is to turn the ray through 45 degrees so that it emerges in a direction parallel to the original direction. The position of prism P1' is chosen so that the distance D2 between the emergent beam and the axis is equal to D1. Many functional variations of this optics are possible. For example, M1 and P1' can be interchanged. A prism of a different form could replace M1 and other prism designs or combinations of mirrors can be substituted for P1'. However, it is essential that the optical path should contain an odd number of reflections, preferably three as shown. This has the consequence that the system behaves as an image inverter. Its behaviour is similar to the well-known Dove and Delta prisms, in that, as the optics are rotated, a distant image viewed through such a prism also appears to rotate, but at an angular velocity twice that of the optics.

Figure 4:
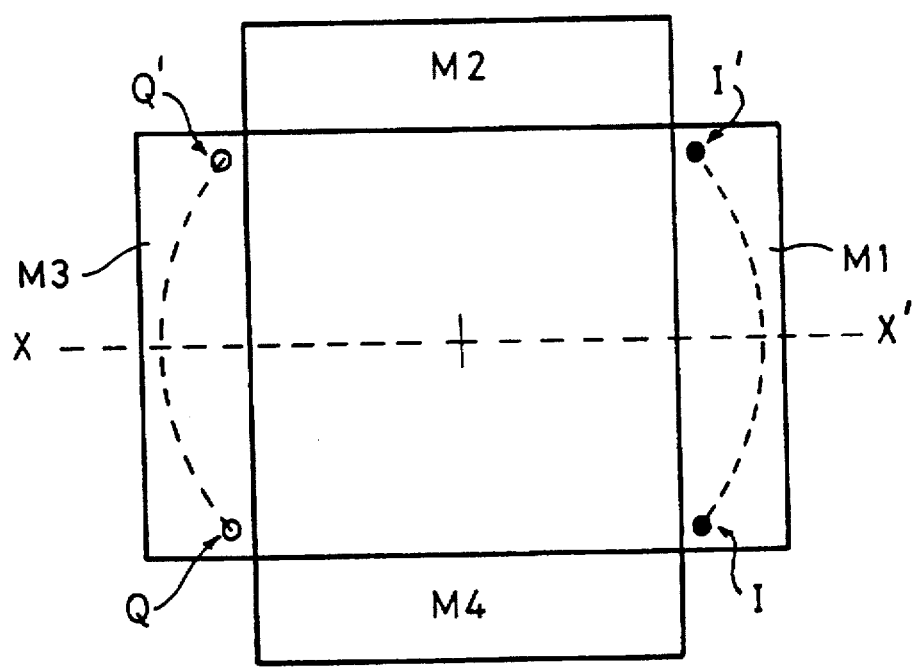

FIG. 4 shows part of the hub optics, as viewed along the axis of rotation. Four rectangular mirrors, M1, M2, M3 and M4, are shown in projection. The line XX' represents the position of the median section shown in FIG. 3. The filled circle at I represents the position of an incident beam, parallel to the axis. As the hub optics rotates, the position of the stationary beam shifts, relative to the optics, to position I', and the dotted line I,I' shows the locus traced by the entry point of the beam. Because of the optical inversion, the emergent beam is initially at the position of the empty circle at Q, and Q,Q' shows its locus of movement, also relative to the optics. Since the optics are rotated, the angular extent of Q,Q', relative to an external frame of reference, is twice that of I,I', i.e. the emergent beam rotates around the axis of rotation at twice the speed of rotation of the optics. This key property means that the beam tracks the disc, which is rotating at twice the speed of the hub.

In the case of the hub optics shown in FIG. 4, when the hub is rotated through 90 degrees, Q returns to its original position as M2 now replaces M1. The emergent beam then repeats its scan in the same location as before, scanning an almost complete half-turn. It is in this respect that the apparatus differs from a conventional Dove prism. FIG. 2 shows hub optics similar to FIG. 4, placed in the centre of a disc equipped with two reading heads R,R'. As in FIG. 4, the solid circle I represents an input beam and the empty circle Q the output. The prisms, including P1 and P2 of FIG. 1, are assumed to be present, but are not shown. The upper reading head R is shown in the middle of its semicircular scan; the lower one R' is inactive and receives no light until it enters the upper half of the disc.

Figure 5A:
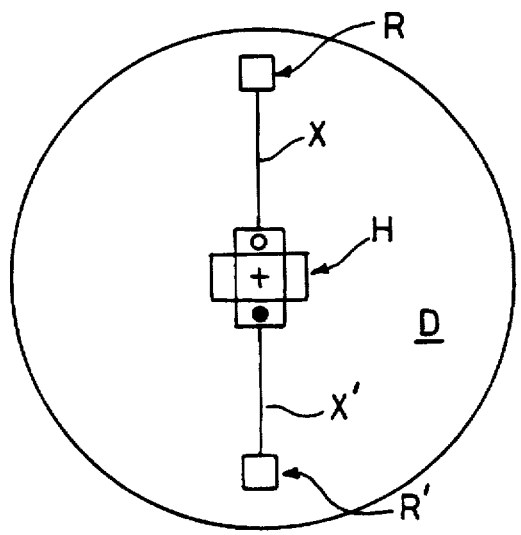
FIGS. 5a to 5d show four other possible embodiments diagrammatically.
Figure 5B:
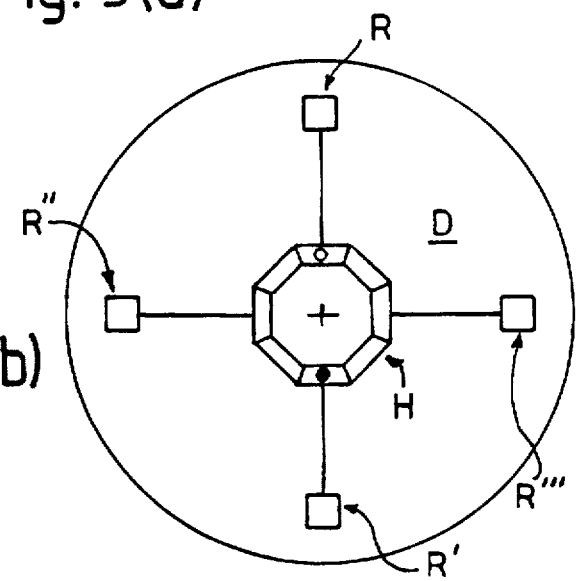
Figure 5C:
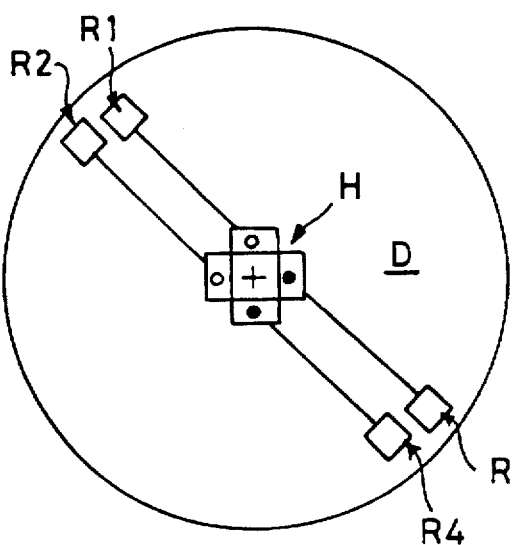
Figure 5D:
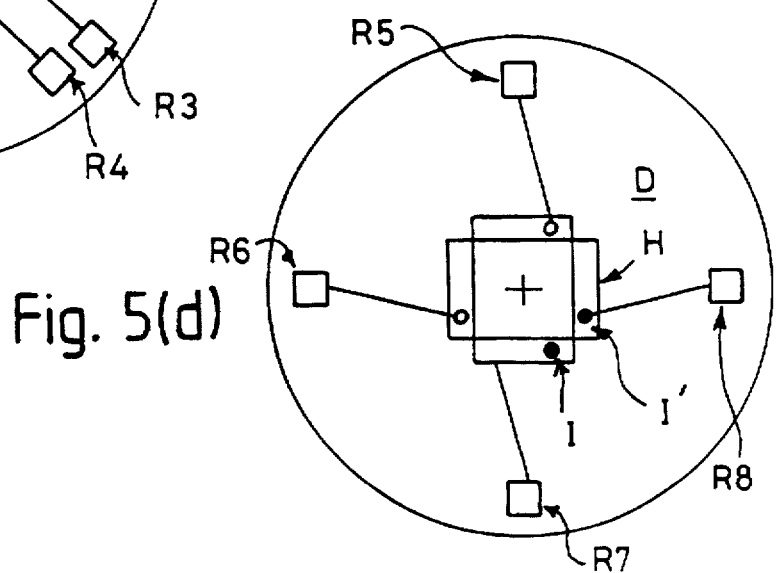

This Figure is repeated with the same conventions as FIG. 5a, but with the addition that radial lines X,X' represent the optical path between such prisms as P1 and P2 in FIG. 1. The purpose of this Figure is to illustrate some useful variations within the defined scope of the invention. FIG. 5b shows how, by increasing the symmetry of the hub optics to eightfold, four reading heads R, R', R", R'" can be served on the disc, though with the penalty that the active sector is reduced to 90 degrees from the original 180 degrees. A sixfold hub, serving three reading heads, is obviously also possible, as are variants with higher symmetry. FIG. 5c shows how two beams, derived from a single laser or two lasers, could be introduced into the hub optics H, and so serve four reading heads R1 to R4 without the necessity of a more complicated hub geometry. With the arrangement shown, the angular extent of the scans of adjacent heads show substantial overlap. In FIG. 5d, the two beams I, I' are introduced at positions 45 degrees apart, with the reading heads R5 to R8 90 degrees apart. This allows the successive scans to overlap in one quadrant, as in FIG. 5b, but permits an even spacing of reading heads around the circumference of the disc. By extension, a similar result is achieved with a larger number of heads, provided the angle between input positions is kept at half that between the heads.

We claim:

1. Optical scanning apparatus comprising a support having an axis of rotation, a plurality, of reading heads mounted on the support to rotate therewith when the support is rotated at uniform angular speed about its axis, at least one optical source, and optical beam-switching means also movable in rotation at uniform angular speed for switching the beam from the source or sources between the reading heads so that successive reading heads are in turn continuously operational over a predetermined segment of a circular line scan whereby a subject relative to which at least the reading head support of the assembly has a linear translational movement may be read by the reading heads.

2. Apparatus according to claim 1, wherein a return beam from the subject is passed reversely through the beam-switching means to a stationary detector.

3. Apparatus according to claim 1, wherein the subject is a planar image-bearing element, such as a phosphor image-storage element, and the beam follows a scanning path of circular form.

4. Apparatus according to claim 3, wherein at least the reading head support is linearly translated in a plane parallel to that of the planar image-bearing element.

5. Apparatus according to claim 1, wherein the subject is a part-cylindrical image-bearing element, and the beam follows a scanning path which lies in a plane normal to the axis of the part-cylinder.

6. Apparatus according to claim 4, wherein at least the reading head support is linearly translated in a direction parallel to the axis of the image-bearing element.

7. Apparatus according to any of claims 1, wherein the beam-switching means is an optical assembly producing optical inversion of the beam from at least one of said sources, so that the beam or beams emergent from the beam-switching means rotate at twice the speed of rotation of said beam-switching means.

8. Apparatus according to claim 7, wherein the speed of rotation of the beam switching means is one half the speed of rotation of the support carrying the reading heads.

9. Apparatus according to claim 7, wherein the beam-inverting, beam-switching means comprises a plurality of single-reflection reflectors angularly spaced around the axis of rotation, and a corresponding plurality of double-reflection reflectors, such as prisms, also angularly spaced around the axis of rotation, the arrangement being such that a beam crosses the axis of rotation in passage between single-reflection and double-reflection reflectors, the total number of reflections occurring in the beam-switching means being an odd number.

10. Apparatus according to claim 9, wherein the odd number of reflections is three.

11. Apparatus according to any of claims 7, wherein the beam-incident axis at the beam-switching means is parallel to and spaced a given distance from the axis of rotation, and the beam-emergent axis is parallel to and spaced by the same given distance from the optical axis, the beam-incident and beam-emergent axes being on diametrically opposite sides of the axis of rotation.

12. Apparatus according to any of claim 1, wherein the reading head support is a disc having the plurality of reading heads spaced around the axis of rotation of said disc at or close to the periphery thereof.

13. Apparatus according to claim 12, wherein reflectors such as prisms are employed to transfer to successive reading heads the beam or beams emergent from the beam-switching means.

14. Apparatus according to claim 13, wherein the beam-switching means is coaxially mounted with the support disc but is rotated at one half the speed of rotation of said support disc.

* * * * *